US007634292B2

(12) United States Patent
Taoka

(10) Patent No.: US 7,634,292 B2
(45) Date of Patent: Dec. 15, 2009

(54) PORTABLE TERMINAL, AND RADIO QUALITY DISPLAY METHOD, PROGRAM, AND SYSTEM

(75) Inventor: Hiroki Taoka, Osaka (JP)

(73) Assignee: Panasonic Corporation, Osaka (JP)

( * ) Notice: Subject to any disclaimer, the term of this patent is extended or adjusted under 35 U.S.C. 154(b) by 449 days.

(21) Appl. No.: 11/630,036

(22) PCT Filed: May 20, 2005

(86) PCT No.: PCT/JP2005/009237

§ 371 (c)(1), (2), (4) Date: Dec. 19, 2006

(87) PCT Pub. No.: WO2006/001140

PCT Pub. Date: Jan. 5, 2006

(65) Prior Publication Data

US 2007/0232345 A1 Oct. 4, 2007

(30) Foreign Application Priority Data

Jun. 24, 2004 (JP) ............................ 2004-186075

(51) Int. Cl.
*H04B 1/06* (2006.01)

(52) U.S. Cl. .................................... 455/550.1; 455/566

(58) Field of Classification Search ................ 455/11.1, 455/426.1, 452.1, 455, 502, 550.1, 552.1, 455/566, 575.1; 370/329, 335, 337, 338
See application file for complete search history.

(56) References Cited

U.S. PATENT DOCUMENTS 5,023,900 A 6/1991 Tayloe (Continued)

FOREIGN PATENT DOCUMENTS

EP 0431956 6/1991

(Continued)

OTHER PUBLICATIONS

Supplementary European Search Report issued May 29, 2008 in European Application No. 05/741,562.

*Primary Examiner*—Thanh C Le
(74) *Attorney, Agent, or Firm*—Wenderoth, Lind & Ponack, L.L.P.

(57) ABSTRACT

A mobile terminal can obtain information on locations where radio wave reception levels are high from other mobile terminals regardless of the radio wave reception level of the mobile terminal. The mobile terminal communicates with one or more other mobile terminals via a base station, and comprises a communications interface enabling the mobile terminal to bypass the base station and communicate with the other mobile terminal, a position detection unit, a radio wave reception level detection unit, a request transmitter unit, an information receiver unit, and an output unit. The position detection unit detects a current position of the mobile terminal. The radio wave reception level detection unit detects a reception level of radio waves from the base station at the current position. The request transmitter unit requests current position information and a radio wave reception level of the other mobile terminal from the other mobile terminal via the communications interface. The information receiver unit receives the current position information and the radio wave reception level of the other mobile terminal from the other mobile terminal via the communications interface. The output unit links the current position information and the radio wave reception level of the mobile terminal with the current position information and the radio wave reception level of the other mobile terminal that the information receiver unit has received, and outputs the linked information and levels.

18 Claims, 10 Drawing Sheets

U.S. PATENT DOCUMENTS

| | | | | |
|---|---|---|---|---|
| 6,400,690 | B1 | 6/2002 | Liu | |
| 6,522,888 | B1 | 2/2003 | Garceran | |
| 6,580,909 | B1 | 6/2003 | Carro | |
| 6,650,629 | B1 * | 11/2003 | Takahashi et al. | 370/335 |
| 7,403,793 | B2 * | 7/2008 | Mauney et al. | 455/552.1 |
| 7,466,989 | B2 * | 12/2008 | Lee et al. | 455/502 |
| 2002/0029108 | A1 | 3/2002 | Liu | |

FOREIGN PATENT DOCUMENTS

| | | |
|---|---|---|
| EP | 1081972 | 3/2001 |
| JP | 11-163784 | 6/1999 |
| JP | 2002-9713 | 1/2002 |
| JP | 2003-199158 | 7/2003 |
| JP | 2003-204296 | 7/2003 |
| JP | 2003-289573 | 10/2003 |
| JP | 2004-186797 | 7/2004 |

* cited by examiner

| Current position flag | Longitude | Latitude | Radio wave reception level |
|---|---|---|---|
| ○ | 135° 22' 30" | 34° 35' 10" | 1 |
| | 135° 22' 20" | 34° 35' 5" | 0 |
| | 135° 22' 34" | 34° 35' 35" | 4 |
| | 135° 21' 45" | 34° 22' 42" | 5 |
| | 135° 21' 0" | 34° 34' 47" | 3 |

Fig. 3

PORTABLE TERMINAL, AND RADIO QUALITY DISPLAY METHOD, PROGRAM, AND SYSTEM

FIELD OF THE INVENTION

The present invention relates to a mobile terminal that outputs both its own current position information and radio wave reception levels and that of other mobile terminals, and a radio quality display method, program, and system using the mobile terminal.

BACKGROUND ART

Mobile terminals such as mobile phones are spreading throughout our daily lives due to their excellent convenience. Users in possession of mobile terminals can make telephone calls from any area. Mobile terminals are equipped with various kinds of functions in addition to the phone function, and the variety of the functions is increasing. Recent mobile terminals are equipped with functions for communicating by radio waves, such as E-mails, the Internet, and videophones.

Radio wave reception levels of a mobile terminal will vary depending on the location. For example, in most cases, radio waves of a mobile terminal are weaker inside buildings and apartments, and stronger outside. Because radio wave reception levels vary depending on the location, the reception level may not always be high where a user uses a mobile terminal. Accordingly, the user needs to check whether the reception level is high or not where the user will use the mobile terminal before the user uses communication services, such as a telephone call, E-mail, the Internet, and videophone, with the mobile terminal. If the radio wave reception level of the mobile terminal is not high, the user has to move to a location where the radio wave reception level is high. However, the user cannot determine a location where the radio wave reception level is high as desired, and therefore, the user needs to search for a location while moving around and checking the radio wave reception level displayed on the mobile terminal.

In order to solve such a problem, one method that has been proposed notifies a user of a location where the radio wave reception level is high. Patent reference 1 discloses a radio quality display system and method. FIG. 9 is a schematic diagram of the radio quality display system disclosed in patent reference 1. In the radio quality display system shown in FIG. 9, a user inputs a request for high reception level position information through an operation panel of a mobile terminal 302. The mobile terminal 302 then transmits area identification information, radio wave reception levels from base stations 303*a* and 303*b*, and current position information from a GPS (Global Position System) to a radio quality server 307 via the base stations 303*a*, 303*b* and a mobile switching network 304. The radio quality server 307 has a database that stores the quality distribution concerning the received area identification information, the received radio wave reception levels, and the received current position information, and extracts from the database a position with a reception level higher than that of the current position of the mobile terminal 302. Thereafter, the radio quality server 307 calculates the direction and the distance from the mobile terminal 302 to the extracted position, and transmits the calculated result to the mobile terminal 302 as high reception level position information. The mobile terminal 302 then displays the high reception level position information received from the radio quality server 307. FIG. 10 shows an example of the high reception level position information displayed on a screen 321. In FIG. 10, the high reception level position information 322 is expressed by a direction and a distance. The user moves to a location in accordance with the high reception level position information 322 displayed on the screen 321 of the mobile terminal 302. The user can thus use communication services at a location where the radio wave reception level is high.

Patent Reference 1: Japan Published Patent Application No. 2003-199158

DISCLOSURE OF THE INVENTION

However, the method disclosed in patent reference 1 continually exchanges information concerning radio wave reception levels with the radio quality server 307 via the mobile switching network 304 including the base terminals 303*a* and 303*b*. Accordingly, this method cannot be applied to the case where the mobile terminal 302 is located where radio waves from the base stations 303*a* and 303*b* cannot reach. In other words, the method of patent reference 1 is only applicable within areas that the radio waves from the base stations 303*a* and 303*b* can reach. Furthermore, in most cases, information concerning a location with a high reception level is needed when the current reception level is low.

The distance between the base stations 303*a* and 303*b* ranges from 500 meters to several kilometers. On the other hand, information on locations with high reception levels that the user needs concerns locations within a range of 10 m to 200 m and the like, which is shorter than the distance between the base stations. Even when the user needs information on locations with high reception levels within such a small range, the base stations 303*a* and 303*b* transmit radio waves over a range wider than the user needs. Accordingly, the base stations 303*a* and 303*b* transmit radio waves over an unnecessarily wide range.

The present invention intends to solve the aforementioned problems, and aims to provide a mobile terminal that can obtain information concerning a location with a high radio wave reception level regardless of the actual radio wave reception levels. The present invention also aims to provide a radio quality display method, program, and system using this mobile terminal.

In order to solve the aforementioned problems, a first aspect of the invention provides a mobile terminal that communicates with one or more other mobile terminals via a base station. The mobile terminal comprises a communications interface configured to enable the mobile terminal to bypass the base station and communicate with the other mobile terminal, a position detection unit, a radio wave reception level detection unit, a request transmitter unit, an information receiver unit, and an output unit. The position detection unit detects the current position of the mobile terminal. The radio wave reception level detection unit detects the reception level of radio waves from the base station at the current position. The request transmitter unit requests current position information and the radio wave reception level of the other mobile terminal from the other mobile terminal via the communication interface. The information receiver unit receives the current position information and the radio wave reception level of the other mobile terminal from the other mobile terminal via the communications interface. The output unit links the current position information and the radio wave reception level of the mobile terminal with the current position information and the radio wave reception level of the other mobile terminal that the information receiver unit has received, and outputs the linked information and levels.

This mobile terminal bypasses the base station and receives current position information and the radio wave reception level directly from another mobile terminal located within a short distance, and then outputs the received information and level. In other words, this mobile terminal outputs the radio wave reception levels and the current position information within the short distance. Thus, a user of this mobile terminal can obtain information concerning a location with a high reception level even when the actual radio wave reception level is low. Then, the user can move to the location with the high radio wave reception level based on the outputted information, and perform communications via a mobile switching network.

A second aspect of the invention provides the mobile terminal according to the first aspect of the invention, and further comprises a first storage unit having a map of a predetermined area that includes the current position of the mobile terminal, wherein the output unit displays and superposes the detected radio wave reception level at a position that corresponds to the current position information of the mobile terminal on the map of the predetermined area, and displays and superposes the received radio wave reception level at a position that corresponds to the current position information of the other mobile terminal on the map of the predetermined area.

The radio wave reception levels of other mobile terminals located within the short distance are mapped and displayed on this mobile terminal. Accordingly, the user can specifically know the location where the radio wave reception level is high, thus obtaining enhanced convenience.

A third aspect of the invention provides the mobile terminal according to the first aspect of the invention, wherein the output unit provides voice output of the current position information and the radio wave reception level of the other mobile terminal that the information receiver unit has received.

This mobile terminal can provide the user with voice announcements of current position information and radio wave reception levels of mobile terminals located within a short distance. Accordingly, the user can hear the voice announcements and learn of locations having a high radio wave reception level, thus obtaining improved convenience.

A fourth aspect of the invention provides the mobile terminal according to the first aspect of the invention, and further comprises a second storage unit having a database that links the current position information and the radio wave reception levels of the mobile terminal and the other mobile terminal, and stores the linked information and levels.

This mobile terminal is in continuous possession of information on locations having high reception levels.

A fifth aspect of the invention provides the mobile terminal according to the fourth aspect of the invention, wherein the second storage unit updates the database based on the current position information and the radio wave reception level of the other mobile terminal that the information receiver unit has received, after a predetermined time period has elapsed since the request transmitter unit transmitted the request.

This mobile terminal updates the database with changes that reflect the current position information and the reception levels of other mobile terminals received during the predetermined time period, and then outputs the information and levels. Accordingly, the mobile terminal can be in possession of and output the latest position information of the locations with high reception levels.

A sixth aspect of the invention provides the mobile terminal according to the fourth aspect, and further comprises a request receiver unit configured to receive the request for the current position information and the radio wave reception level of the other mobile terminal from a user, wherein the second storage unit updates the database based on the current position information and the radio wave reception level of the other mobile terminal that the information receiver unit has received, after a predetermined time period has elapsed since the request receiver unit received the request.

This mobile terminal updates the database with changes that reflect position information on locations with high radio wave reception levels, and outputs the information within a predetermined time period after the user requests position information on locations with high radio wave reception levels. Accordingly, the mobile terminal can be in possession of and output the latest position information of the location with high reception levels.

Furthermore, in order to solve the aforementioned problems, a seventh aspect of the invention provides a mobile terminal that communicates with one or more other mobile terminals via a base station. The mobile terminal comprises a communications interface configured to enable the mobile terminal to bypass the base station and communicate with the other mobile terminal, a request receiver unit, a position detection unit, a radio wave reception level detection unit, and an information transmitter unit. The request receiver unit receives a request for current position information and the radio wave reception level of the mobile terminal from the other mobile terminal via the communications interface. The position detection unit detects the current position of the mobile terminal in response to the request. The radio wave reception level detection unit detects the reception level of radio waves from the base station at the current position of the mobile terminal in response to the request. The information transmitter unit transmits the detected current position information and the detected radio wave reception level of the mobile terminal to the other mobile terminal via the communications interface.

This mobile terminal can bypass the base station and can transmit the current position information and the radio wave reception level directly to other mobile terminals within a short distance.

An eighth aspect of the invention provides the mobile terminal according to the seventh aspect of the invention, and further comprises an information receiver unit configured to receive current position information and the radio wave reception level of the other mobile terminal via the communications interface, and an output unit configured to link the detected current position information and the detected radio wave reception level of the mobile terminal with the received current position information and the received radio wave reception level of the other mobile terminal, and outputting the linked information and levels.

This mobile terminal bypasses the base station and receives the current position information and the radio wave reception level directly from the other mobile terminal within a short distance, and then outputs the information and levels. In other words, this mobile terminal outputs the radio wave reception level and the current position information within the short distance. Thus, a user of this mobile terminal can obtain information concerning locations with high reception levels even when the actual reception level is low. Then, the user can move to the location with a high reception level based on the outputted information, and communicate via a mobile switching network.

A ninth aspect of the invention provides the mobile terminal according to the eighth aspect of the invention, and further comprises a first storage unit having a map of a predetermined area that includes the current position of the mobile terminal, wherein the output unit displays and superposes the detected radio wave reception level at a position that corresponds to the current position information of the mobile terminal on the map of the predetermined area, and displays and superposes the received radio wave reception level at a position that corresponds to the current position information of the other mobile terminal on the map of the predetermined area.

This mobile terminal displays a map which maps the radio wave reception levels of other mobile terminals located within a short distance. Accordingly, the user can specifically learn the location where the radio wave reception level is high, thus obtaining improved convenience.

A tenth aspect of the invention provides the mobile terminal according to the eighth aspect of the invention, wherein the output unit provides voice output of the received current position information and the received radio wave reception level of the other mobile terminal.

This mobile terminal can provide the user with voice announcements of the current position information and the radio wave reception level of the mobile terminal located within a short distance. Accordingly, the user can hear the voice announcements and learn the location having a high radio wave reception level, thus obtaining improved convenience.

An eleventh aspect of the invention provides the mobile terminal according to the seventh aspect of the invention, and further comprises an information receiver unit configured to receive the current position information and the radio wave reception level of the other mobile terminal via the communications interface, and a second storage unit having a database configured to link the current position information and the radio wave reception levels between the mobile terminal and the other mobile terminal, and stores the linked information and levels.

This mobile terminal continuously obtains and stores position information on locations with high reception levels.

A twelfth aspect of the invention provides the mobile terminal according to the eleventh aspect of the invention, wherein the second storage unit updates the database based on the received current position information and the received radio wave reception level of the other mobile terminal, after a predetermined time period has elapsed since the request receiver unit received the request.

This mobile terminal updates the database with changes that reflect the current position information and the reception levels of the other mobile terminals received during a period of the predetermined time, and then outputs the information and levels. Accordingly, the mobile terminal can have and output the latest position information of the locations with high reception levels.

In order to solve the aforementioned problems, a thirteenth aspect of the invention provides a radio quality display method of a mobile terminal that communicates with one or more other mobile terminals via a base station. The radio quality display method of the mobile terminal comprises the following steps:

a step of detecting the current position of the mobile terminal;

a step of detecting the reception level of radio waves from the base station at the current position;

a step of requesting current position information and the radio wave reception level of the other mobile terminal from the other mobile terminal via a communications interface configured to enable the mobile terminal to bypass the base station and communicate with the other mobile terminal;

a step of receiving the current position information and the radio wave reception level of the other mobile terminal from the other mobile terminal via the communications interface; and a step of linking the current position information and the radio wave reception levels of the mobile terminal and the other mobile terminal, and outputting the linked information and levels.

According to this radio quality display method, the mobile terminal bypasses the base station and receives the current position information and the radio wave reception levels directly from the other mobile terminals located within a short distance, and then outputs the information and levels. In other words, this mobile terminal outputs the radio wave reception levels and the current position information within the short distance. Thus, a user of this mobile terminal can obtain information concerning locations with high reception levels even when the actual reception level is low. Then, the user can move to and perform communication at the location with a high reception level based on the outputted information.

In order to solve the aforementioned problems, a fourteenth aspect of the invention provides a radio quality display method of a mobile terminal that communicates with one or more other mobile terminals via a base station. The radio quality display method of the mobile terminal comprises the following steps:

a step of receiving a request for current position information and the radio wave reception level of the mobile terminal from the other mobile terminal via a communications interface configured to enable the mobile terminal to bypass the base station and communicate with the other mobile terminal;

a step of detecting the current position of the mobile terminal in response to the request;

a step of detecting a reception level of radio waves from the base station at the current position in response to the request; and a step of transmitting the detected current position information and the detected radio wave reception level of the mobile terminal to the other mobile terminal via the communications interface.

According to this radio quality display method, the mobile terminal can bypass the base station and transmit the current position information and the radio wave reception level to other mobile terminals located within a short distance without the base station.

In order to solve the aforementioned problems, a fifteenth aspect of the invention provides a radio quality display program for a mobile terminal executed by a computer that communicates with one or more other mobile terminals via a base station. The radio quality display program for a radio terminal causes the computer to function as the following means:

means of detecting the current position of the mobile terminal;

means of detecting the reception level of radio waves from the base station at the current position;

means of requesting current position information and the radio wave reception level of the other mobile terminal from the other mobile terminal via a communications interface configured to enable the mobile terminal to bypass the base station and communicate with the other mobile terminal;

means of receiving the current position information and the radio wave reception level of the other mobile terminal from the other mobile terminal via the communications interface; and means of linking the current position information and the radio wave reception levels of the mobile terminal and the other mobile terminal, and then outputting the linked information and levels.

According to this radio quality display program, the mobile terminal bypasses the base station and receives the current position information and the radio wave reception levels directly from other mobile terminals located within a short distance, and then outputs the information and levels. In other words, this mobile terminal outputs the radio wave reception levels and the current position information within the short distance. Thus, a user of this mobile terminal can obtain information concerning locations with high reception levels even when the actual reception level is low. Then, the user can move to and perform communication at the location with a high reception level based on the outputted information.

Furthermore, in order to solve the aforementioned problems, a sixteenth aspect of the invention provides a radio quality display program for a mobile terminal executed by a computer that communicates with one or more other mobile terminals via a base station. The radio quality display program for a radio terminal causes the computer to function as the following means:

means of receiving a request for current position information and the radio wave reception level of the mobile terminal from the other mobile terminal via a communications interface configured to enable the mobile terminal to communicate with the other mobile terminal to bypass the base station in communication with the other mobile terminal;

means of detecting a current position of the mobile terminal in response to the request;

means of detecting the radio wave reception level of the mobile terminal at the current position in response to the request; and means of transmitting the detected current position and the detected radio wave reception level of the mobile terminal to the other mobile terminal via the communications interface.

According to this radio quality display program, the mobile terminal can bypass the base station and transmit the current position information and the radio wave reception levels to the other mobile terminals located within a short distance.

In order to solve the aforementioned problems, a seventeenth aspect of the invention provides a radio quality display system that comprises the mobile terminals of the first and seventh aspects of the invention, and a base station configured to relay communication between the mobile terminals.

According to this radio quality display system, the mobile terminals can bypass the base station and exchange position information and reception levels. Thus, a user of the mobile terminal can learn the reception levels within a short distance. Accordingly, the user of the mobile terminal can obtain information concerning locations with high reception levels even when the user stays at a location with a low reception level of the mobile terminal. Then, the user can move to and perform communication at the location with a high reception level based on the outputted information.

According to the present invention, a user can obtain information concerning locations with high radio wave reception levels regardless of the actual radio wave reception levels of the mobile terminal.

BRIEF DESCRIPTION OF THE DRAWINGS

FIG. 3 is an illustration of the concept of a radio wave reception level distribution database stored in the mobile terminal;

PREFERRED EMBODIMENTS OF THE INVENTION

First Embodiment (1) Outline

Figure 1:
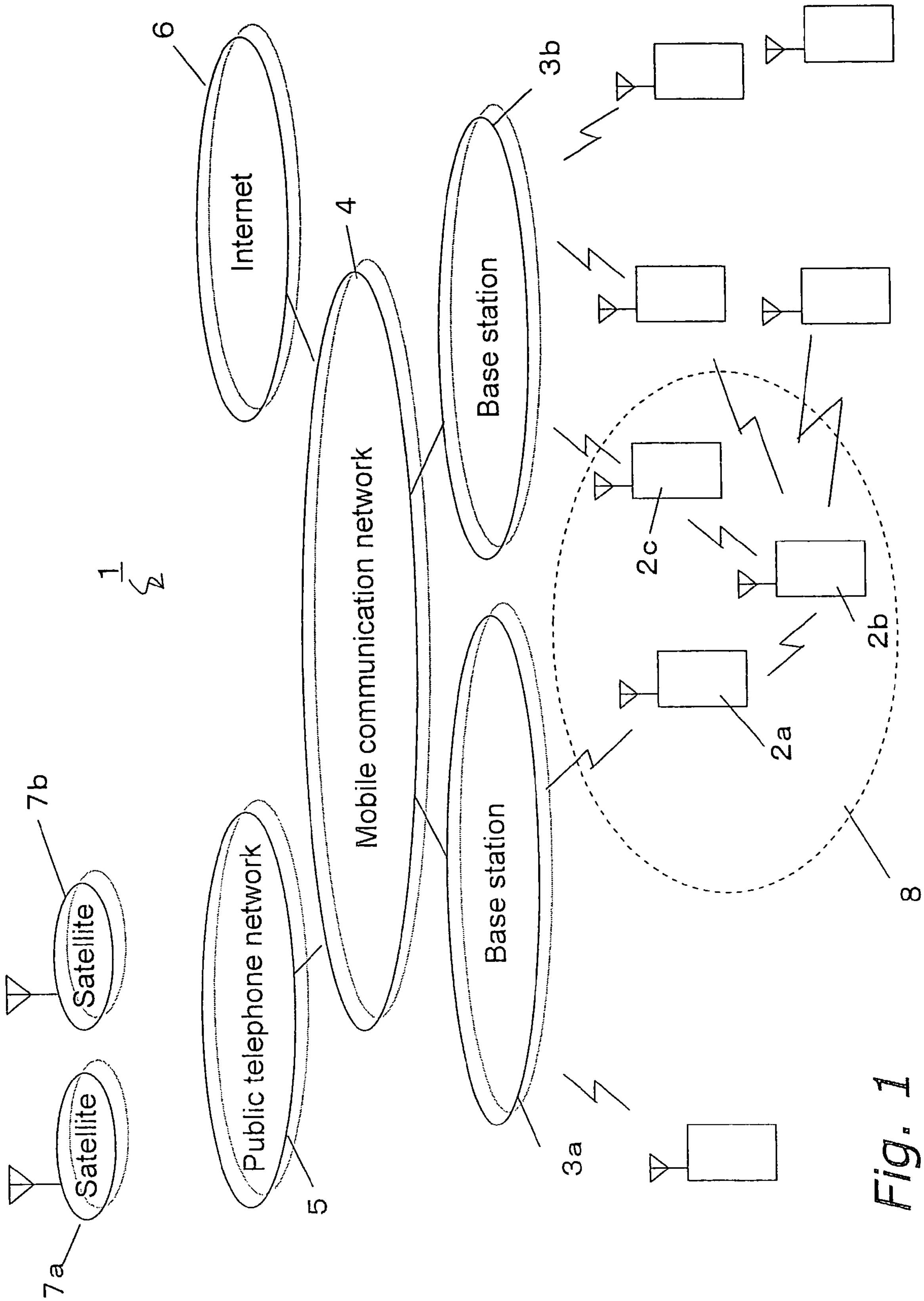
FIG. 1 is a schematic diagram of a radio quality display system according to a first embodiment of the present invention.

FIG. 1 is a schematic diagram of a radio quality display system according to the first embodiment of the present invention. The radio quality display system 1 shown in FIG. 1 includes mobile terminals 2 and a mobile communication network 4. The mobile communication network 4 includes a plurality of base stations 3*a*, 3*b* and a management server (not shown). The base stations 3*a* and 3*b* relay communication between the mobile terminals 2. The management server manages position information that represents a range of which base station each mobile terminal 2 is located and the like. The mobile communication network 4 may be connected to a public telephone network 5 and the Internet 6 via gateways which are not shown.

The mobile terminals 2 according to the present embodiment are divided into mobile terminal groups 8 which each consist of a plurality of mobile terminals 2*a*, 2*b* and 2*c* that are located within a short distance from each other. The mobile terminals 2*a*, 2*b* and 2*c* in one of the mobile terminal groups 8 can bypass the base stations 3*a* and 3*b* and communicate with each other. In other words, the mobile terminals 2*a*, 2*b* and 2*c* in the mobile terminal group 8 can communicate directly with each other. For example, the mobile terminal 2*a* and the mobile terminal 2*b* perform wireless communications with each other. Each of the mobile terminal groups 8 comprises mobile terminals that are located within the reach of radio waves used in short range communications from a mobile terminal located at the center. In other words, selecting different mobile terminals as the ones located at the center forms a number of mobile terminal groups. In order to simplify the explanation, the following will explain the mobile terminal group 8 with the mobile terminal 2*a* at the center among a plurality of mobile terminal groups.

Note that the short range communications in the present invention correspond to those having a communication ranges from several tens of meters to several hundreds of meters. Available protocols of the short range communications include, for example, IEEE802.11 and IEEE802.15, etc., but the protocols are not limited to specific ones. In other words, the protocol for the short range communications according to the present invention may be a protocol which enables the mobile terminals in the mobile terminal group 8 to communicate within a distance between the mobile terminals and the base station. The short range communications according to the present invention may be ad hoc communications that establish a network when needed. Furthermore, the short range communications according to the present invention may be implemented in a multi-node network that includes access points for relaying communications.

(2) Functions

Figure 2:
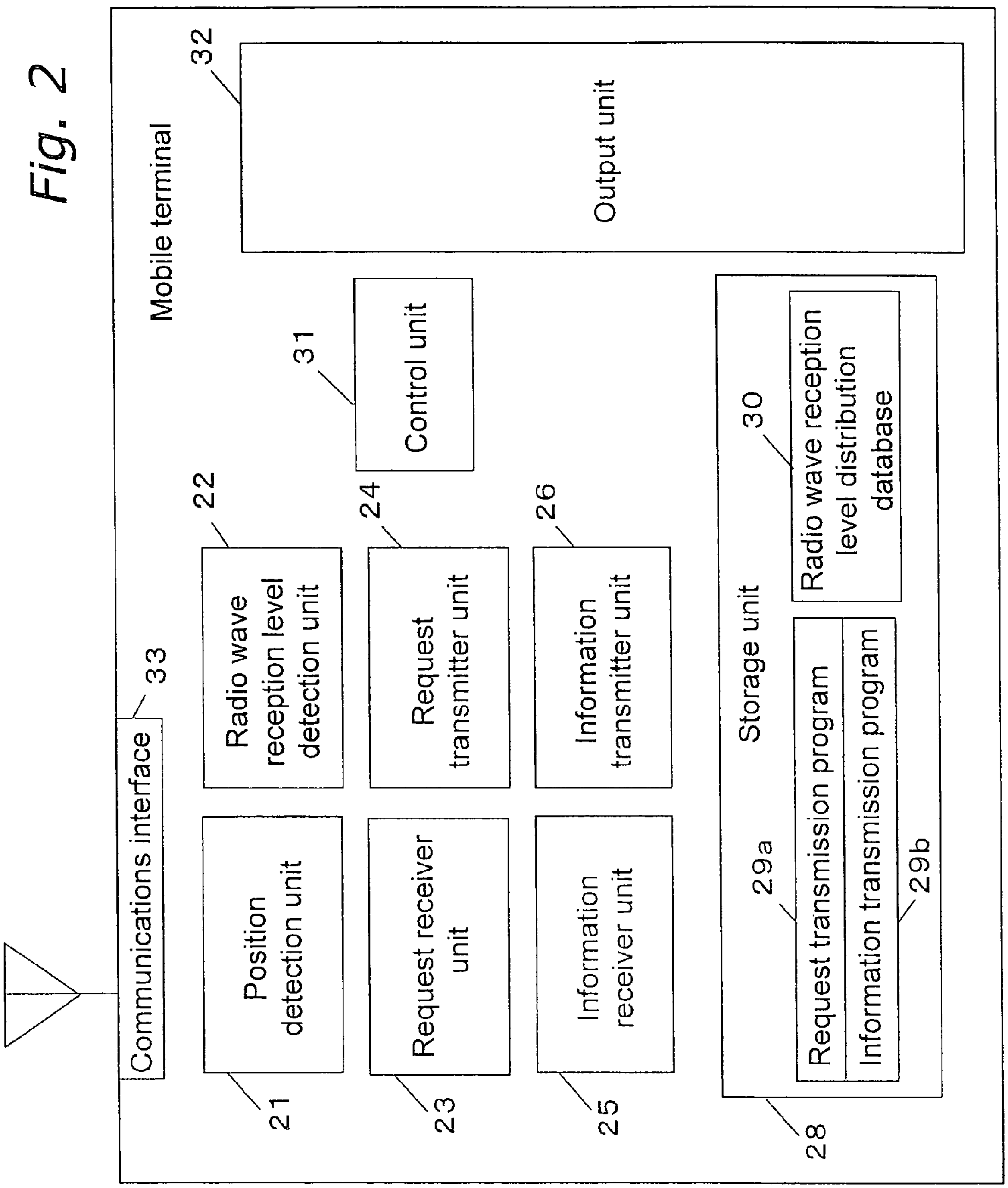
FIG. 2 is a functional block diagram of a mobile terminal according to the first embodiment of the present invention.

Next, functions of the mobile terminal 2 according to the first embodiment of the present invention will be explained. FIG. 2 is a functional block diagram of the mobile terminal 2 according to the first embodiment of the present invention. The mobile terminal 2 of FIG. 2 comprises a position detection unit 21, a radio wave reception level detection unit 22, a request receiver unit 23, a request transmitter unit 24, an information receiver unit 25, an information transmitter unit 26, a storage 28, a control unit 31, an output unit 32, and a communications interface 33. The details of each function will be explained as follows.

(2-1) Position Detection Unit

The position detection unit 21 detects the current position of the mobile terminal. A GPS (Global Positioning System) terminal function realized by the position detection unit 21 may be one example of a means for detecting the current position. In the GPS, each of a plurality of satellites 7*a* and 7*b* that orbit the Earth transmits a signal to the ground. The position detection unit 21 of the mobile terminal 2 receives the signal that each of the satellites 7*a* and 7*b* has transmitted. At this time, there is a time difference between the times at which the position detection unit 21 receives the signals. The position detection unit 21 calculates the distances from the mobile terminal 2 to the satellites 7*a* and 7*b* on the basis of the time difference and detects the current position.

Note that the function of the position detection unit 21 of the present invention is not limited to the GPS function. Alternatively, the position detection unit may detect the current position of the mobile terminal by using a position detection method employed in PHS.

(2-2) Radio Wave Reception Level Detection Unit

The radio wave reception level detection unit 22 detects the reception level of radio waves from the base station 3 at the current position of the mobile terminal. The radio wave reception level means the intensity of radio waves used in communications. In the present invention, the radio wave reception level is indicated in 6 levels, where "5" is the highest reception level and "0" is the lowest one.

(2-3) Request Transmitter Unit/Receiver Unit

In response to an instruction inputted by the user, the request transmitter unit 24 requests another mobile terminal transmit its current position information and radio wave reception level via the communications interface 33. Here, the communications interface 33 is provided in order to enable the mobile terminals to bypass the base stations 3*a* and 3*b* and communicate directly therebetween. The instruction is inputted by the user, for example, by pressing a radio information obtaining button installed on the mobile terminal 2. Here, the "radio information obtaining button" is a button that the user in possession of the mobile terminal 2 presses when the user wants to obtain information concerning locations with high reception levels within a short range of the mobile terminal 2.

The request receiver unit 23 receives a request to transmit current position information and the radio wave reception level of the mobile terminal from one or more other mobile terminals via the communications interface 33. For example, assume that the mobile terminal 2*a* is the mobile terminal that the user is in possession of, and the other mobile terminals 2*b* and 2*c* are the other mobile terminals. When the request receiver unit 23 of the mobile terminal 2*a* has received a request from the mobile terminal 2*b* or 2*c*, it means that the radio information obtaining button installed on the mobile terminal 2*b* or 2*c* has been pressed by the user in possession of the mobile terminal 2*b* or 2*c*.

(2-4) Information Transmitter Unit/Receiver Unit

The information receiver unit 25 receives current position information and radio wave reception levels from the other mobile terminals that are located in the short range communications area via the communications interface 33.

The information transmitter unit 26 transmits current position information and the radio wave reception level of the mobile terminal to another mobile terminal via the communications interface 33, in response to a request received by the request receiver unit 23.

(2-5) Storage Unit

The storage unit 28 (corresponding to the second storage unit) has various programs and a radio wave reception level distribution database (hereinafter, radio wave reception level distribution DB) 30.

The various programs include a request transmission program 29*a* and an information transmission program 29*b*. The request transmission program 29*a* is a program for use in transmitting a request to transmit current position information and radio wave reception levels to other mobile terminals. The information transmission program 29*b* is a program for use in transmitting information including current position information and the radio wave reception level of the mobile terminal to other mobile terminals. Both the programs are read and executed by the control unit 31.

FIG. 3 is a conceptual illustration of the information stored in the radio wave reception level distribution DB 30. The radio wave reception level distribution DB 30 links current position information and the radio wave reception levels of the mobile terminal with position information and radio wave reception levels at the position of the other mobile terminals from where the position information and radio wave reception levels were received, and stores the linked information and levels as one record. In this example, the current position information of each mobile terminal is indicated by longitudes and latitudes. The radio wave reception level distribution DB 30 also stores a current position flag indicating the current position information and radio wave reception level of the mobile terminal that includes the radio wave reception level distribution DB 30. The current position flag indicates which record out of the stored records includes information about the mobile terminal itself. Furthermore, the radio wave reception level distribution DB 30 may also store altitudes from the Earth surface in addition to longitudes and latitudes. This clarifies differences in radio wave reception levels between locations below and above the ground even if the locations have the same longitude and latitude, such as with the floors of a building.

The storage unit 28 updates the radio wave reception level distribution DB 30 when obtaining current position information and radio wave reception levels of the mobile terminal itself or that of other mobile terminals.

Note that the storage unit 28 can delete the right amount of information in view of the capacity of the storage unit 28. Specifically, the storage unit 28 can delete the records that include current position information on locations which are more than a predetermined distance away from the current position of the mobile terminal itself, because the records are considered to be less important for that mobile terminal. Alternatively, after the output unit 32, which will be described below, outputs current position information and the radio wave reception level, the storage unit 28 may delete the outputted current position information and radio wave reception level.

(2-6) Output Unit

Figure 4:
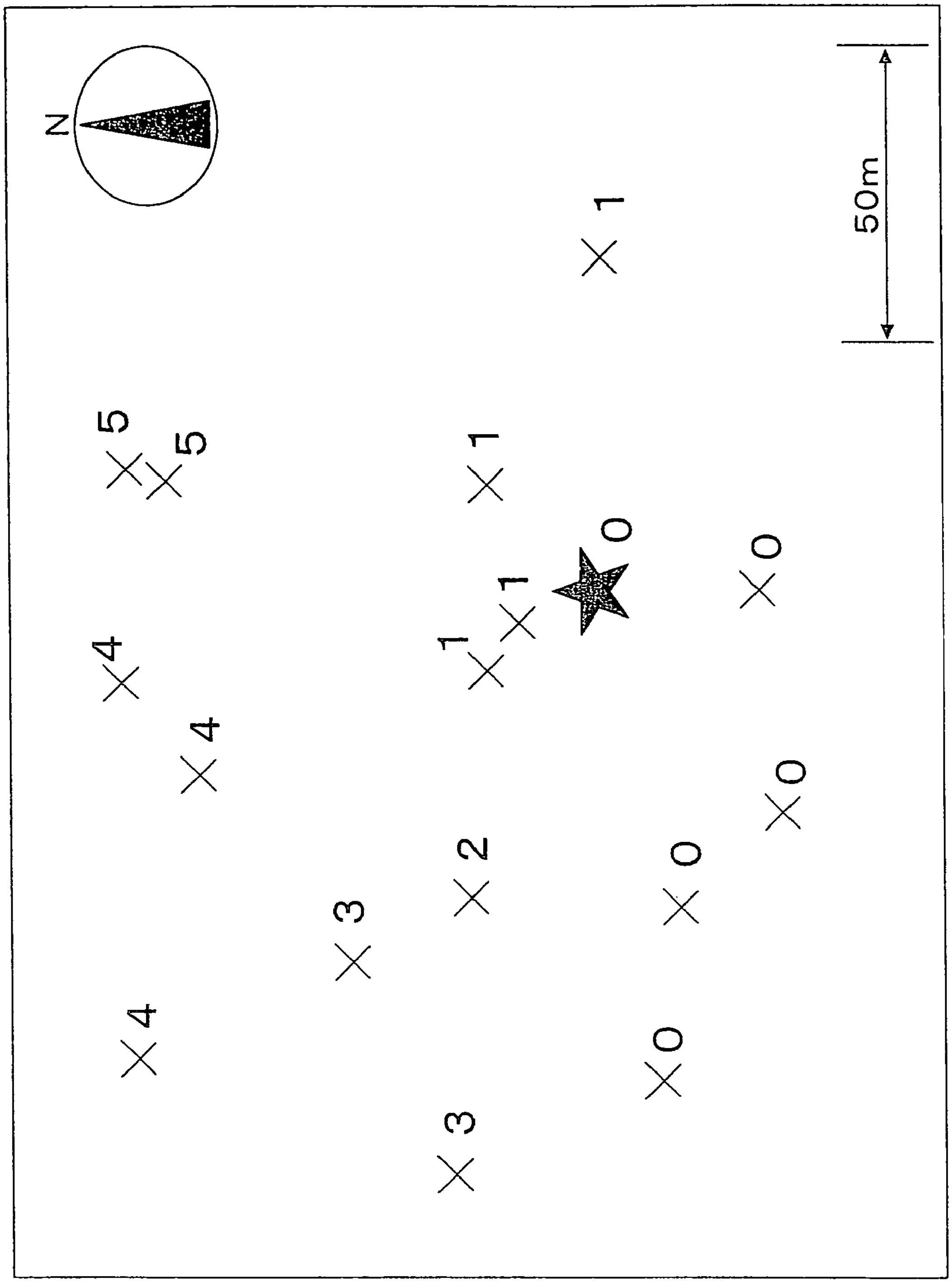
FIG. 4 shows an output display of the mobile terminal according to the first embodiment of the present invention.

The output unit 32 respectively links current position information and the radio wave reception level of the mobile terminal itself with current position information and the radio wave reception levels of other mobile terminals received by the information receiver unit 25, and outputs the linked information and levels. The output may be produced in visual or audio form, a combination thereof, etc. FIG. 4 shows an example of an output display of position information and radio wave reception levels of mobile terminals. In this example, a case is taken as an example where information stored in the radio wave reception level distribution DB 30 is displayed on a screen of the mobile terminal 2*a* in the form of a distribution map. Specifically, the output unit 32 displays the distribution of current position information on the screen on the basis of the longitudes and latitudes that the radio wave reception level distribution DB 30 stores, and numerically expresses a radio wave reception level linked with each of the displayed current position information. Furthermore, in FIG. 4, the current position of the mobile terminal that includes the output unit is indicated with a mark different from marks indicating current positions of other mobile terminals, in order to clarify the information corresponding to the mobile terminal itself among the displayed current position information and radio wave reception levels.

The distribution map displayed on the mobile terminal 2 may also include an electronic compass indicating scales and directions generated on the basis of the longitudes and latitudes stored in the radio wave reception level distribution DB 30 so that the user can easily have a sense of distance and direction.

(3) Operational Flows

Figure 5:
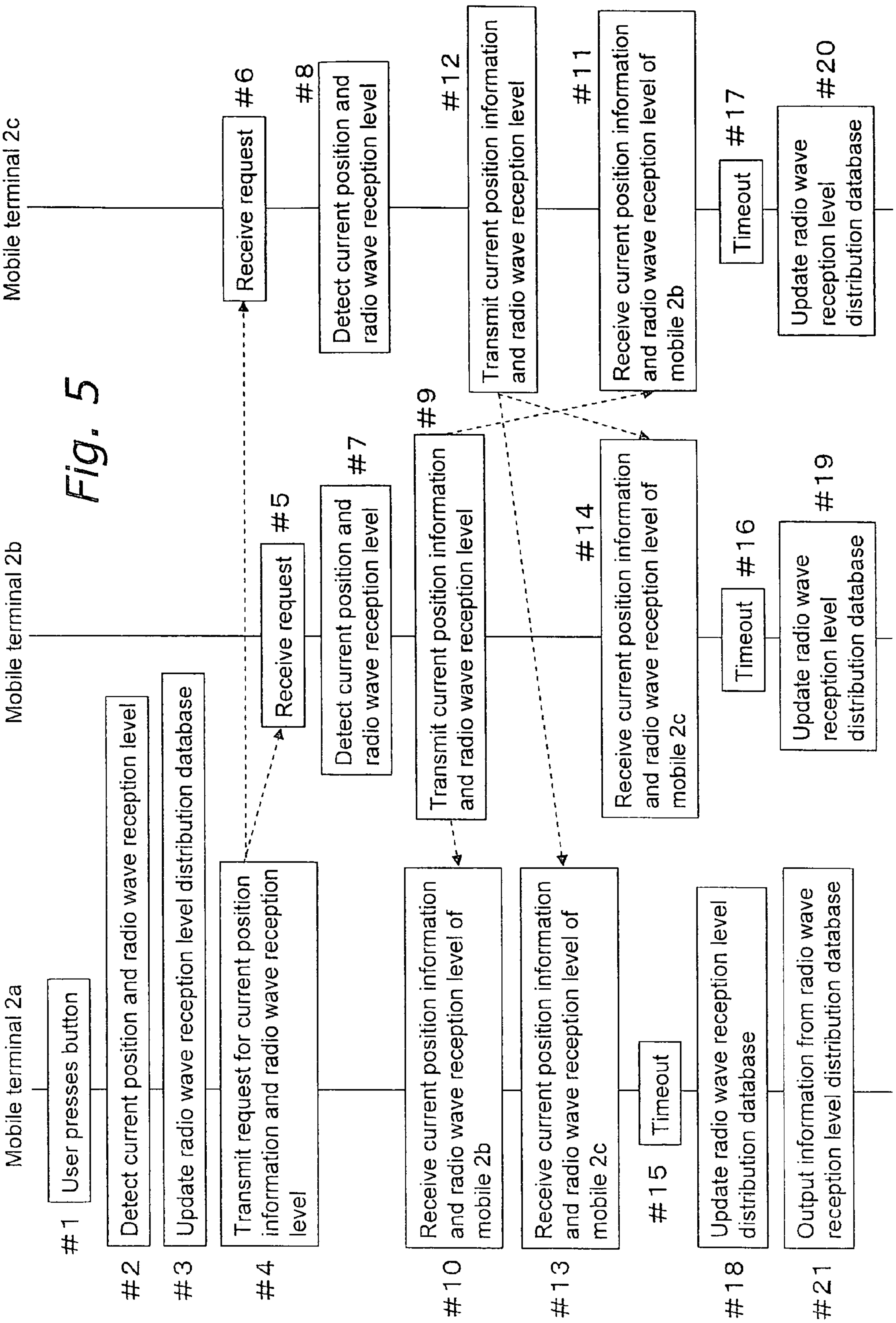
FIG. 5 is an operational flow chart of the radio quality display system comprising the mobile terminal according to the first embodiment of the present invention.

Next, operational flows of the radio quality display system using the mobile terminals according to the first embodiment of the present invention will be explained. FIG. 5 is an operational flow chart of the radio quality display system using the mobile terminals 2*a*, 2*b*, and 2*c* according to the first embodiment of the present invention. The following assumes that a user of the mobile terminal 2*a* wants to obtain information concerning locations with high radio wave reception levels.

First, the user of the mobile terminal 2*a* presses the radio information obtaining button of the mobile terminal 2*a* (#1), and then the position detection unit 21 of the mobile terminal 2*a* detects a current position of the mobile terminal 2*a* (#2). Furthermore, the radio wave reception level detection unit 22 of the mobile terminal 2*a* detects the reception level of radio waves from the base station at the current position detected by the position detection unit 21 (#2).

The storage unit 28 of the mobile terminal 2*a* writes the current position information and the radio wave reception level detected by the position detection unit 21 and the radio wave reception level detection unit 22, respectively, into the radio wave reception level distribution DB 30 (#3).

Subsequently, the request transmitter unit 24 of the mobile terminal 2*a* transmits a request to transmit current position information and radio wave reception levels directly to the mobile terminal group 8 in the short range communications area via the communications interface 33 (#4). Here, the request transmitter unit 24 of the mobile terminal 2*a* starts measuring the time elapsed since the request was transmitted.

When the request receiver unit 23 of each of the mobile terminals 2*b* and 2*c* in the mobile terminal group 8 receives the request from the mobile terminal 2*a* (#5, 6), the position detection unit 21 and the radio wave reception level detection unit 22 of each of the mobile terminals 2*b* and 2*c* detect the current position and the radio wave reception level of each of the mobile terminals (#7, 8). Here, the request transmitter unit 24 of each of the mobile terminals 2*b* and 2*c* starts measuring the time elapsed since the request was received.

The information transmitter unit 26 of the mobile terminal 2*b* transmits its detected current position information and its detected radio wave reception level directly to the other mobile terminals 2*a* and 2*c* in the short range communications area via the communications interface 33 (#9). The information receiver unit 25 of each of the mobile terminals 2*a* and 2*c* receives them directly via the communications interface 33 (#10, 11).

Similarly, the information transmitter unit 26 of the mobile terminal 2*c* transmits its detected current position information and its detected radio wave reception level directly to the other mobile terminals 2*a* and 2*b* in the short range communications area via the communications interface 33 (#12). The information receiver unit 25 of each of the mobile terminals 2*a* and 2*b* receives them directly via the communications interface 33 (#13, 14).

The storage unit 28 of the mobile terminal 2*a* writes into the radio wave reception level distribution DB 30 the current position information and the radio wave reception levels that the information receiver unit 25 has received from the other mobile terminals within a predetermined time period after the mobile terminal 2*a* transmitted the request (#15, #18). Thereafter, the output unit 32 of the mobile terminal 2*a* outputs the current position and the radio wave reception level of the mobile terminal 2*a* and the other mobile terminals on the basis of the updated radio wave reception level distribution DB 30 (#21).

On the other hand, each of the mobile terminals 2*b* and 2*c* writes into the radio wave reception level distribution DB 30 the current position information and the radio wave reception levels that were received within a predetermined time period after the request receiver unit 24 received the request (#16, 17, 19, 20). The mobile terminals 2*b* and 2*c* that receive the request may output an update notification of the radio wave reception level distribution DB 30. Furthermore, the mobile terminals 2*b* and 2*c* that receive the request may also accept a request from the user and output the latest position information and the latest radio wave reception levels of their own and the other mobile terminals, in response to the request.

Note that, in the operational flows described above, the request transmitter/receiver unit of each of the mobile terminals 2*a*, 2*b*, and 2*c* starts measuring the time elapsed since the unit transmits/receives the request from the mobile terminal 2*a*, but the start timing is not limited thereto. For example, the mobile terminal 2*a* may start measuring the time at the time when the user presses the radio information obtaining button. This allows the mobile terminal 2*a* to update the radio wave reception level distribution DB 30 with the right timing without continuously waiting for current position and radio wave reception levels from other mobile terminals, even if the mobile terminal 2*a* receives no response to the request because no other mobile terminals exist in the mobile terminal group 8 with the mobile terminal 2*a* located at the center. The mobile terminal 2*a* can also have and output the latest position information concerning locations with high reception levels.

In addition, the mobile terminals 2*a*, 2*b*, and 2*c* may update their own radio wave reception level distribution DBs 30 when receiving the current position information and the radio wave reception levels from other mobile terminals. This allows the mobile terminals to have and output the latest position information concerning locations with high reception levels.

(4) Effects

The mobile terminal according to the first embodiment receives the current position information and the radio wave reception levels directly from other mobile terminals located within a short range communications area, and outputs the received information and levels. Thus, a user of this mobile terminal can obtain the information concerning locations with high reception levels even at a location where the reception level is low. Then, the user can move to the location with the high reception level based on the outputted information, and perform communications via the mobile communication network 4.

Second Embodiment (1) Outline

Figure 6:
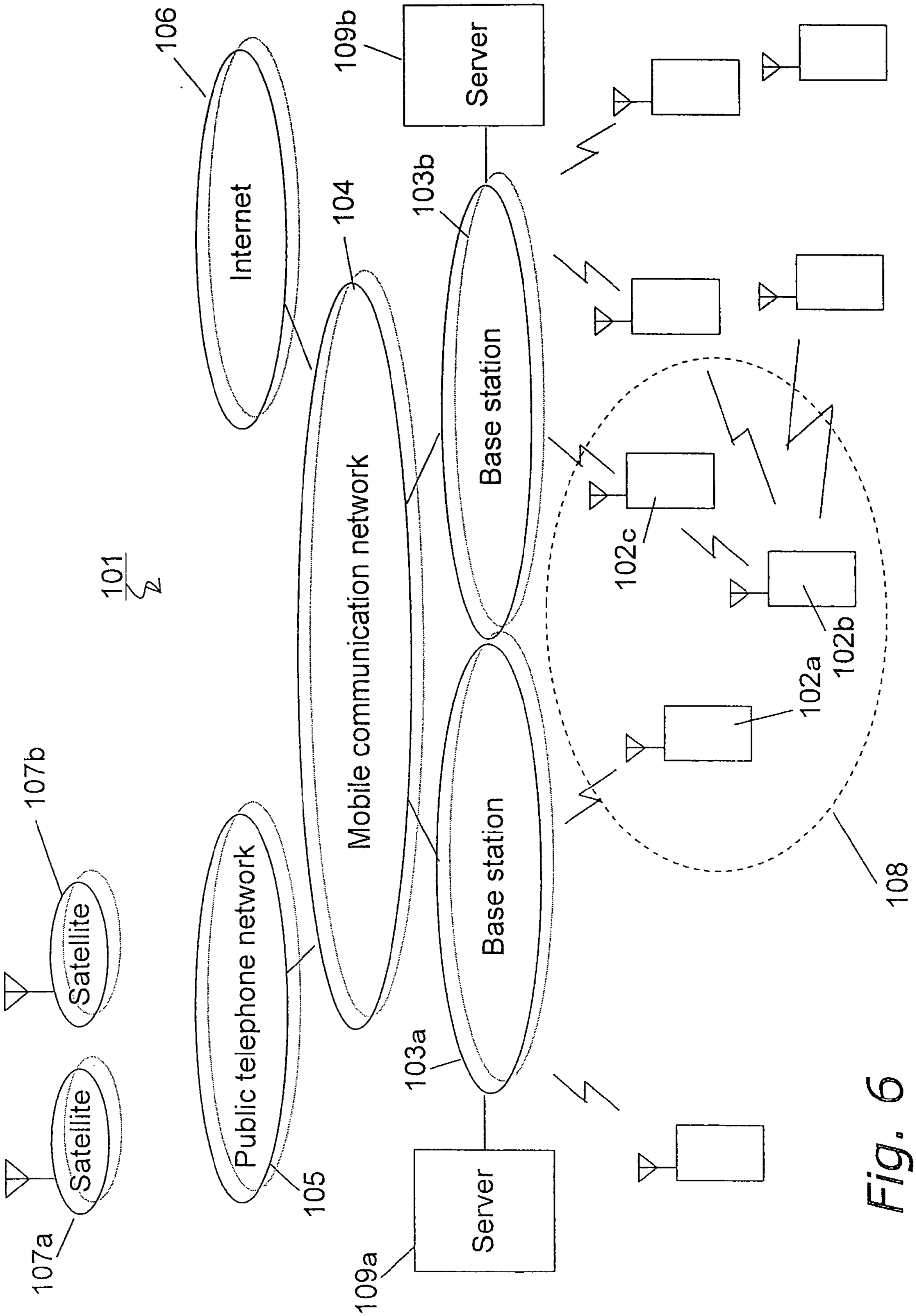
FIG. 6 is a schematic diagram of a radio quality display system according to a second embodiment of the present invention.

FIG. 6 is a schematic diagram of a radio quality display system according to a second embodiment of the present invention. The radio quality display system of FIG. 6 further includes servers 109*a* and 109*b* connected to the base stations 103*a* and 103*b*, respectively. Each of the servers 109*a* and 109*b* has a map. Other components of this radio quality display system 101 are similar to those of the first embodiment.

(2) Functions

Figure 7:
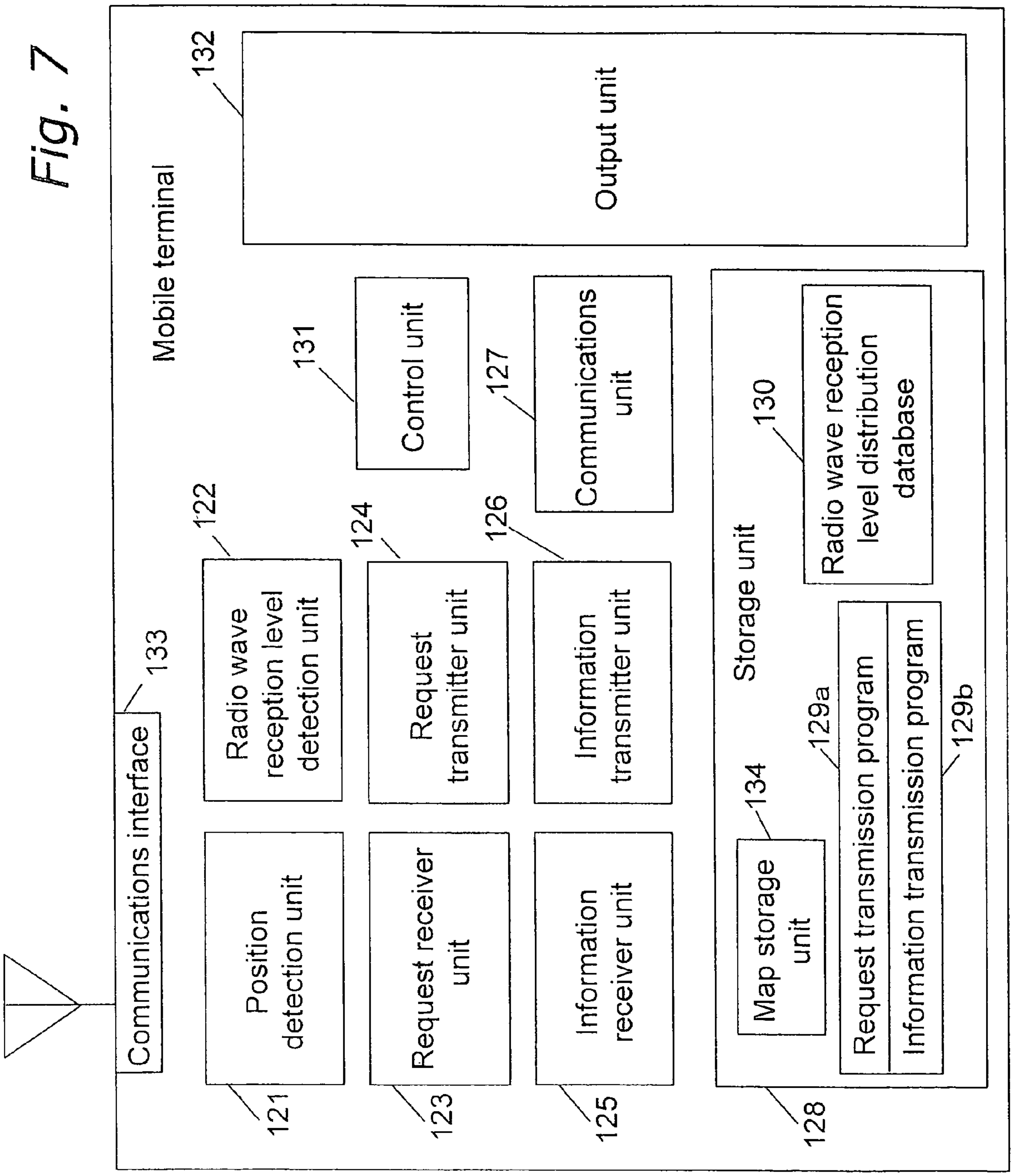
FIG. 7 is a functional block diagram of a mobile terminal according to the second embodiment of the present invention.

FIG. 7 is a functional block diagram of a mobile terminal 102 according to the second embodiment of the present invention. The mobile terminal 102 of FIG. 7 further includes a communications unit 127. The communications unit 127 downloads a map of a predetermined area that includes the current position of the mobile terminal that includes the communications unit from the server 109*a* or 109*b*. Specifically, the communications unit 127 downloads from the server 109*a* or 109*b* a map of an area corresponding to the longitude and latitude stored in the radio wave reception level distribution DB 30. Furthermore, the storage unit 128 includes a map storage unit 134 (corresponding to the first storage unit) storing the downloaded map. Other components of this mobile terminal 102 are similar to those of the first embodiment.

(3) Output Forms

Figure 8:
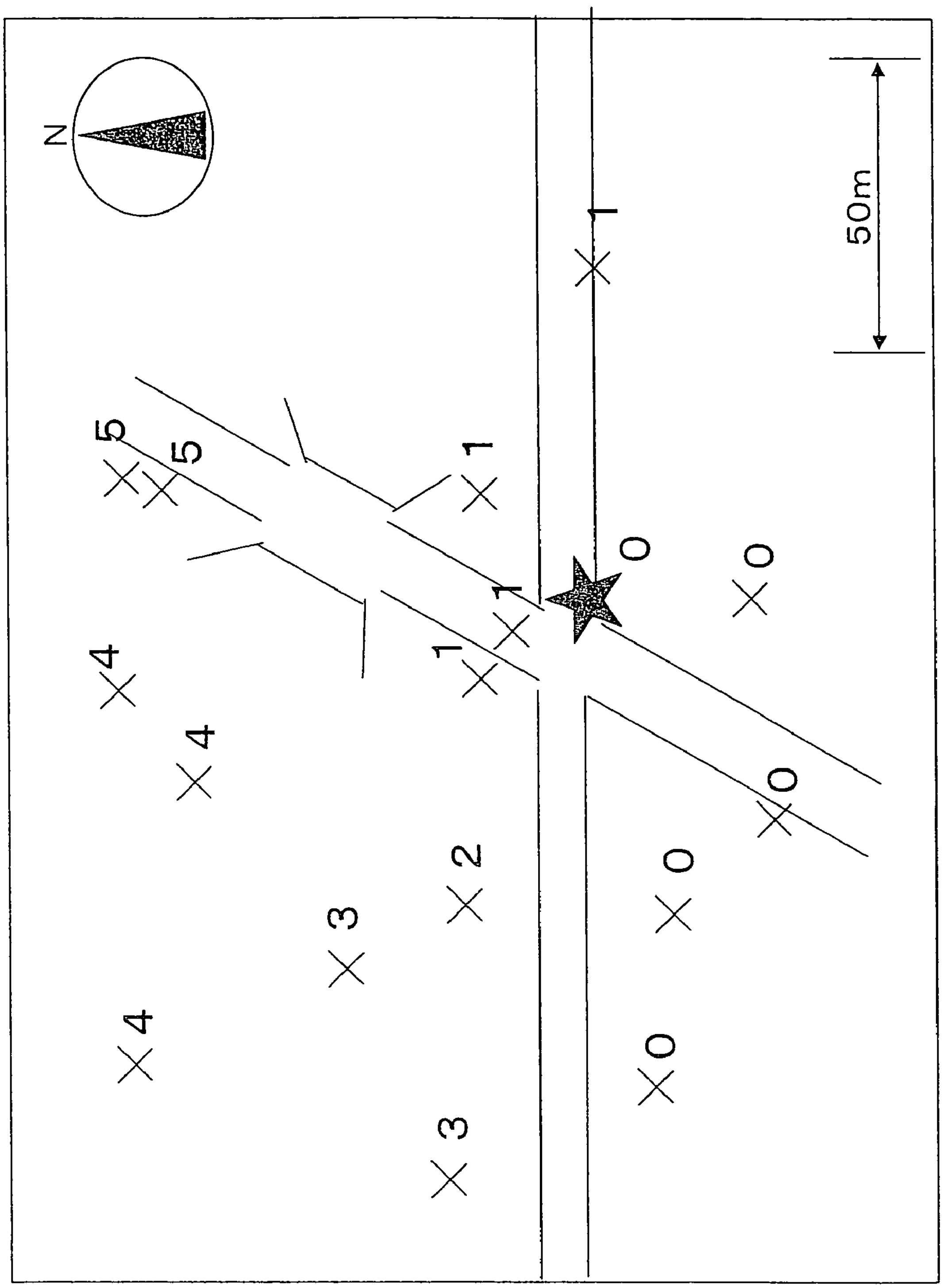
FIG. 8 shows an output display of the mobile terminal according to the second embodiment of the present invention.
Figure 9:
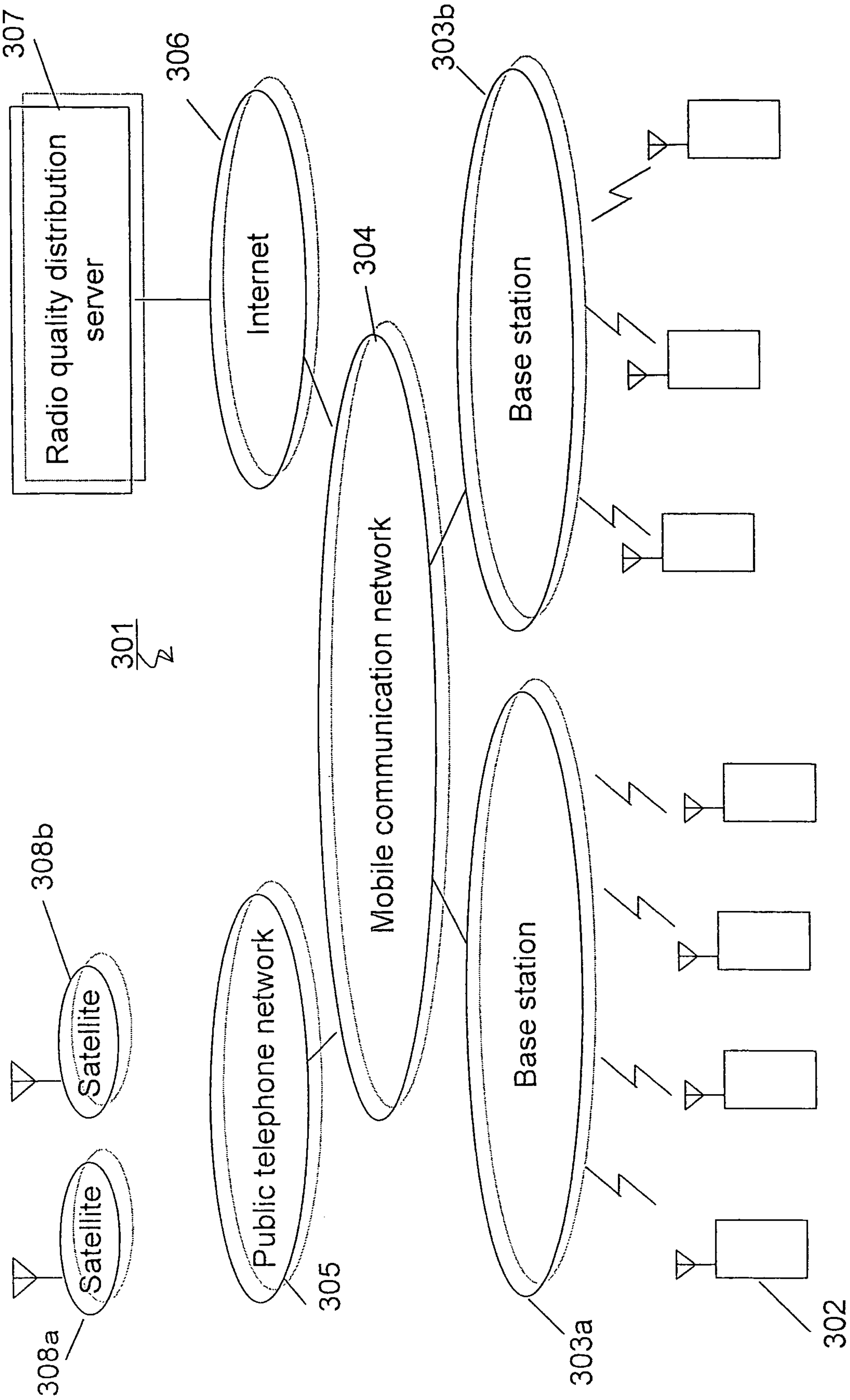
FIG. 9 is a schematic diagram of a high radio quality display system according to patent reference 1.
Figure 10:
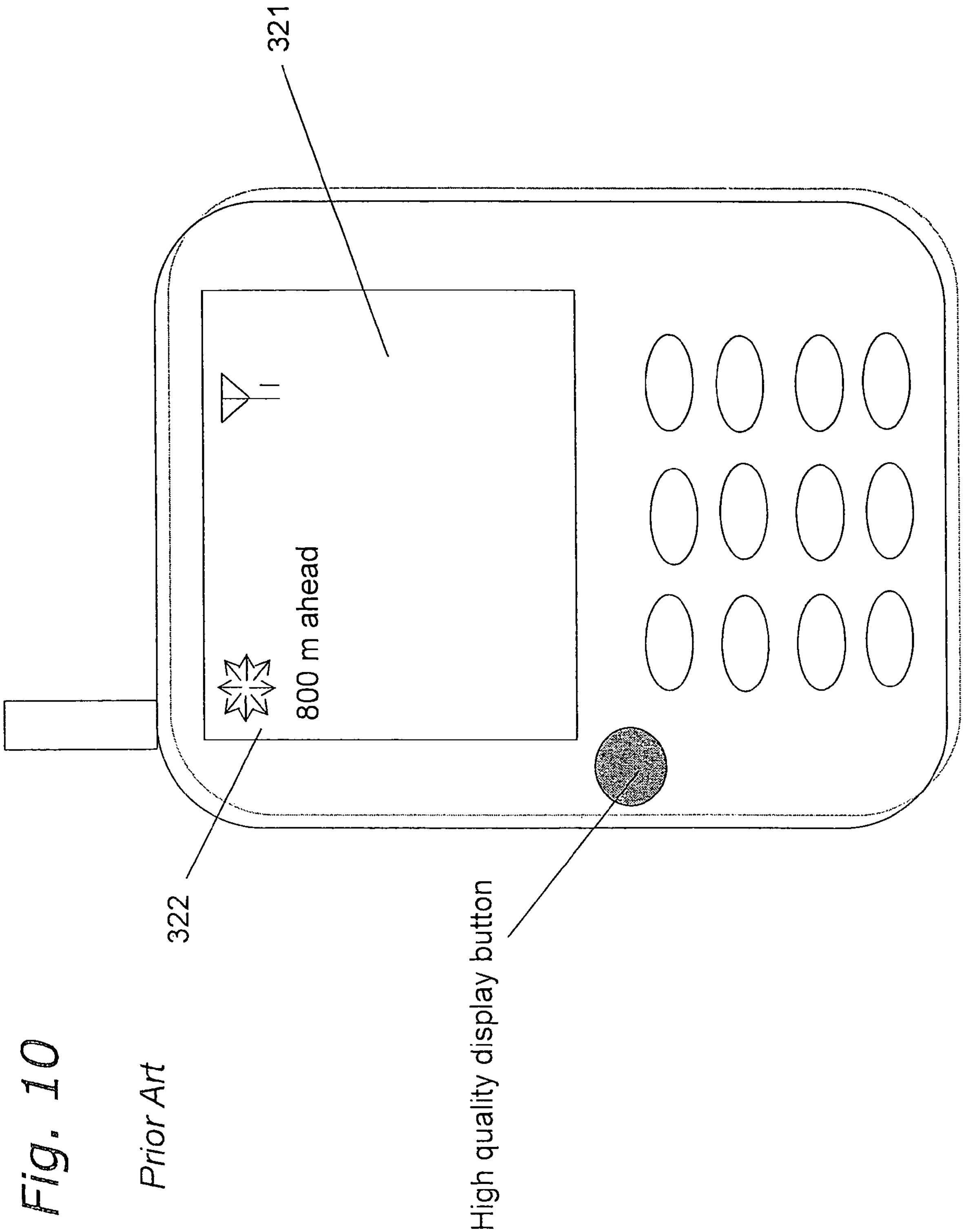
FIG. 10 shows an example of high reception position information displayed on a mobile terminal according to patent reference 1.

Next, the following explains an output form of the mobile terminal according to the second embodiment of the present invention. FIG. 8 shows an output display of the mobile terminal 102 according to the second embodiment. This embodiment takes as an example a case where the information stored in the radio wave reception level distribution DB 30 is displayed and superposed on the map on the screen of the mobile terminal 2*a*. Specifically, the output unit 132 displays and superposes the detected radio wave reception level at a position corresponding to the current position information of the mobile terminal 102*a* on the map of a predetermined area including the current position of the mobile terminal 102*a*, which has been downloaded by the communications unit 127 from the server 109*a* or 109*b* and stored in the map storage unit 134, and the output unit 132 displays and superposes the received reception levels at positions corresponding to the current positions of the other mobile terminals 2*b* and 2*c* on the map of the predetermined area. In FIG. 8, the current position of the mobile terminal is indicated with a mark different from marks indicating the current positions of the other mobile terminals, in order to clarify the mobile terminal information from amongst the displayed current position information and radio wave reception levels.

The map displayed on the mobile terminal 102 may also includes an electronic compass to indicate scales and directions generated on the basis of the longitudes and latitudes stored in the radio wave reception level distribution DB 30 so that the user can easily have the sense of distance and direction.

(4) Operational Flows

The operational flows of the radio quality display system 101 using the mobile terminals 102 according to the second embodiment of the present invention are similar to those of the first embodiment, so an explanation thereof will be omitted.

(5) Effects

The radio wave reception levels of the mobile terminals located in the short range communications area are displayed and superposed on the map on the screen of this mobile terminal. Accordingly, the user can specifically know locations where radio wave reception levels are high, thus obtaining improved convenience.

The present embodiment may employ the following output configurations. The output unit 132 of the mobile terminal 102*a* compares the radio wave reception level of the mobile terminal 102*a* with the reception levels of the other mobile terminals 102*b* and 102*c* stored in the radio wave reception level distribution DB, and selects the records of the other mobile terminals 102*b* and 102*c* that have reception levels higher than that of the mobile terminal 102*a*. Then, the output unit 132 compares the longitude and latitude of the mobile terminal 102*a* with the longitudes and latitudes of the mobile terminals 102*b* and 102*c* in the selected records, and further selects the record of the mobile terminal which is closest to the mobile terminal 102*a* in distance. Among the positions on the map displayed on the screen of the mobile terminal 102*a*, the current position of the record selected in the above-described manner may be blinked or indicated in a color different from ones used for the other records. In this way, the position that the user will aim for is further displayed in enhanced form on the screen of the mobile terminal 102*a*, and accordingly, the user of the mobile terminal 102*a* can clearly know the positions where the reception levels are high, thus obtaining enhanced convenience.

Note that the communications unit 127 downloads a map from the server in the present embodiment, but the method is not limited thereto. For example, the mobile terminal 102 according to the present embodiment may have a map stored therein in advance. In other words, the map storage unit 134 stores the map of a predetermined area that includes the current position of the mobile terminal that comprises the map storage unit. The output unit displays and superposes radio wave reception levels of the position information in a short range communications area on the map that is stored in the map storage unit 134 in advance. In this case, the communications unit 127 does not have to download the map from the server.

Third embodiment (1) Outline, Functions, and Operational Flows

The functions of mobile terminals, and the outline and operational flows of a radio quality display system using the mobile terminals according to a third embodiment of the present invention are similar to those of the first embodiment, thus an explanation thereof will be omitted.

(2) Output Forms

The following explains an output form of the mobile terminal according to the third embodiment of the present invention. The output unit of the mobile terminal according to the third embodiment produces voice outputs of the current position information and radio wave reception levels of other mobile terminals that the information receiver unit has received. Specifically, the output unit compares the radio wave reception level of the mobile terminal that includes the output unit with the reception levels of the other mobile terminals stored in the radio wave reception level distribution DB, and selects records of the other mobile terminals whose reception levels are higher than that of the mobile terminal that includes the output unit. Thereafter, the output unit compares the longitudes and latitudes of the other mobile terminals of the selected records with the longitude and latitude of the mobile terminal that includes the output unit, and further selects the record of the other mobile terminal which is closest in distance to the mobile terminal that includes the output unit. The output unit provides the user with voice announcements of the direction and distance from the current position of the other mobile terminal in the selected record to the current position of the mobile terminal.

The output unit may also produce visual and audible outputs by using the configuration of the radio quality display system and the mobile terminals according to the second embodiment. The communications unit downloads a map of a predetermined area that includes the current position of the mobile terminal that comprises the communications unit from a server connected to a base station, and temporarily stores the map in the map storage unit. The output unit displays and superposes the detected radio wave reception level at a position corresponding to the current position information of the mobile terminal on the temporarily stored map of a predetermined area including the current position of the mobile terminal, and the output unit displays and superposes the received reception levels at positions corresponding to the current positions of the other mobile terminals on the map of the predetermined area. Furthermore, the output unit provides the user with voice announcements of the route and distance from the current position of the other mobile terminal in the record selected in the above-described manner to the current position of the mobile terminal.

Note that, when using the configuration of the radio quality display system according to the second embodiment, the communications unit downloads the maps from the server, but the method is not limited thereto. For example, the mobile terminal according to the present embodiment may store the maps in the mobile terminal in advance. In other words, the map storage unit stores a map of a predetermined area that includes the current position of the mobile terminal that comprises the map storage unit. The output unit displays and superposes radio wave reception levels of the position information in the short range communications area on the map stored in the map storage unit in advance, and provides the user with voice announcements of the route and distance from a predetermined current position to the current position of the mobile terminal. In this case, the communications unit does not have to download the map from the server.

(3) Effects

This mobile terminal can produce voice outputs of the current position information and radio wave reception levels of other mobile terminals located in a short range communications area, and notify a user thereof. Accordingly, the user will be able to learn of locations with high reception levels through the voice announcements.

INDUSTRIAL APPLICABILIY

The mobile terminal according to the present invention can be applied to a mobile terminal that performs communication via a base station, such as a mobile phone. By applying the present invention to such a mobile terminal, the mobile terminal can bypass the base station and obtain current position information and radio wave reception levels directly from adjacent mobile terminals located within a short range, even if a reception level between the mobile terminal and the base station is low. Accordingly, the present invention can enhance the convenience of a mobile phone and the like.

The invention claimed is:

1. A mobile terminal that communicates with one or more other mobile terminals via a base station, the mobile terminal comprising:

a communications interface configured to enable the mobile terminal to bypass the base station and communicate with the other mobile terminal;

a position detection unit configured to detect the current position of the mobile terminal;

a radio wave reception level detection unit configured to detect a reception level of radio waves from the base station at the current position;

a request transmitter unit configured to request current position information and a radio wave reception level of the other mobile terminal from the other mobile terminal via the communications interface;

an information receiver unit configured to receive the current position information and the radio wave reception level of the other mobile terminal from the other mobile terminal via the communications interface; and an output unit configured to link the current position information and the radio wave reception level of the mobile terminal with the current position information and the radio wave reception level of the other mobile terminal that the information receiver unit has received, respectively, and output the linked information and levels.

2. The mobile terminal according to claim 1, further comprising a first storage unit having a map of a predetermined area that includes the current position of the mobile terminal, wherein the output unit displays and superposes the detected radio wave reception level at a position that corresponds to the current position information of the mobile terminal on the map of the predetermined area, and displays and superposes the received radio wave reception level at a position that corresponds to the current position information of the other mobile terminal on the map of the predetermined area.

3. The mobile terminal according to claim 1, wherein the output unit provides voice output of the current position information and the radio wave reception level of the other mobile terminal that the information receiver unit has received.

4. The mobile terminal according to claim 1, further comprising a second storage unit having a database configured to link the current position information and the radio wave reception levels of the mobile terminal and the other mobile terminal, and store the linked information and levels.

5. The mobile terminal according to claim 4 wherein the second storage unit updates the database based on the current position information and the radio wave reception level of the other mobile terminal that the information receiver unit has received, after a predetermined time period has elapsed since the request transmitter unit transmitted the request.

6. The mobile terminal according to claim 4, further comprising a request receiver unit configured to receive the request for the current position information and the radio wave reception level of the other mobile terminal from a user, wherein the second storage unit updates the database based on the current position information and the radio wave reception level of the other mobile terminal that the information receiver unit has received, after a predetermined time period has elapsed since the request receiver unit received the request.

7. A radio quality display system comprising:

the mobile terminals according to claim 1; and a base station configured to relay communication between the mobile terminals.

8. A mobile terminal that communicates with one or more other mobile terminals via a base station, the mobile terminal comprising:

a communications interface configured to enable the mobile terminal to bypass the base station and communicate with the other mobile terminal;

a request receiver unit configured to receive a request for current position information and a radio wave reception level of the mobile terminal from the other mobile terminal via the communications interface;

a position detection unit configured to detect the current position of the mobile terminal in response to the request;

a radio wave reception level detection unit configured to detect a reception level of radio waves from the base station at the current position of the mobile terminal in response to the request; and an information transmitter unit configured to transmit the detected current position information and the detected radio wave reception level of the mobile terminal to the other mobile terminal via the communications interface.

9. The mobile terminal according to claim 8, further comprising an information receiver unit configured to receive current position information and a radio wave reception level of the other mobile terminal via the communications interface; and an output unit configured to link the detected current position information and the detected radio wave reception level of the mobile terminal with the received current position information and the received radio wave reception level of the other mobile terminal, and output the linked information and levels.

10. The mobile terminal according to claim 9, further comprising a first storage unit having a map of a predetermined area that includes the current position of the mobile terminal, wherein the output unit displays and superposes the detected radio wave reception level at a position that corresponds to the current position information of the mobile terminal on the map of the predetermined area, and displays and superposes the received radio wave reception level at a position that corresponds to the current position information of the other mobile terminal on the map of the predetermined area.

11. The mobile terminal according to claim 9, wherein the output unit provides voice output of the received current position information and the radio wave reception level of the other mobile terminal.

12. The mobile terminal according to claim 8 further comprising an information receiver unit configured to receive the current position information and the radio wave reception level of the other mobile terminal via the communications interface; and a second storage unit having a database configured to link the current position information and the radio wave reception levels of the mobile terminal and the other mobile terminal, and store the linked information and levels.

13. The mobile terminal according to claim 12, wherein the second storage unit updates the database based on the received current position information and the received radio wave reception level of the other mobile terminal, after a predetermined time period has elapsed since the request receiver unit received the request.

14. A radio quality display system comprising:

the mobile terminals according to claim 8; and a base station configured to relay communication between the mobile terminals.

15. A radio quality display method of a mobile terminal that communicates with one or more other mobile terminals via a base station, the method comprising the steps of:

detecting a current position of the mobile terminal;

detecting a reception level of radio waves from the base station at the current position;

requesting current position information and a radio wave reception level of the other mobile terminal from the other mobile terminal via a communications interface configured to enable the mobile terminal to bypass the base station and communicate with the other mobile terminal;

receiving the current position information and the radio wave reception level of the other mobile terminal from the other mobile terminal via the communication interface; and linking the current position information and the radio wave reception levels of the mobile terminal and the other mobile terminal, and outputting the linked information and levels.

16. A radio quality display method of a mobile terminal that communicates with one or more other mobile terminals via a base station, the method comprising the steps of:

receiving a request for a current position information and a radio wave reception level of the mobile terminal from the other mobile terminal via a communications interface configured to enable the mobile terminal to bypass the base station and communicate with the other mobile terminal;

detecting a current position of the mobile terminal in response to the request;

detecting a reception level of radio waves from the base station at the current position in response to the request; and transmitting the detected current position information and the detected radio wave reception level of the mobile terminal to the other mobile terminal via the communications interface.

17. A mobile terminal executed by a computer that communicates with one or more other mobile terminals via a base station, said computer having stored thereon a program causing the computer to implement a method comprising:

detecting a current position of the mobile terminal;

detecting a reception level of radio waves from the base station at the current position;

requesting current position information and a radio wave reception level of the other mobile terminal from the other mobile terminal via a communications interface configured to enable the mobile terminal to bypass the base station and communicate with the other mobile terminal;

receiving the current position information and the radio wave reception level of the other mobile terminal from the other mobile terminal via the communications interface; and linking the current position information and the radio wave reception levels of the mobile terminal and the other mobile terminal, and outputting the linked information and levels.

18. A mobile terminal executed by a computer that communicates with one or more other mobile terminals via a base station, said computer having stored thereon a program causing the computer to implement a method comprising:

receiving a request for current position information and a radio wave reception level of the mobile terminal from the other mobile terminal via a communications interface configured to enable the mobile terminal to bypass the base station and communicate with the other mobile terminal;

detecting a current position of the mobile terminal in response to the request;

detecting a radio wave reception level of the mobile terminal at the current position in response to the request; and transmitting the detected current position and the detected radio wave reception level of the mobile terminal to the other mobile terminal via the communications interface.

* * * * *